Jan. 2, 1940.  L. G. KUHLMAN  2,185,202

CALCULATING DEVICE

Filed Oct. 11, 1937

INVENTOR.
Leo G. Kuhlman
BY
Murray, Jackhoff, Zugelter & Paddack
ATTORNEYS

Patented Jan. 2, 1940

2,185,202

UNITED STATES PATENT OFFICE 2,185,202

CALCULATING DEVICE

Leo G. Kuhlman, Covington, Ky.

Application October 11, 1937, Serial No. 168,403

1 Claim. (Cl. 235—70)

The present invention relates to a calculating device and has for an object the provision of means whereby the past performances of entrants in a proximate race, e. g., motor boats, cars, race horses, etc., may be reduced to rating factors and the differences in ratings equalized according to established handicap factors which may be allotted to the various entrants for establishing parity between them.

Another object of the invention is to provide a simple and easily operated means for the purposes stated, which means is susceptible to embodiment in several forms.

These and other objects are obtained by the means described herein and disclosed in the following drawing, in which.

Devices of the present invention are essentially arranged to provide for quickly rating entrants in a contest of speed according to past performances, using an arbitrary set of rating figures which are subdivided into units each of which represents at least two factors that are useful in establishing handicap allotments. Such devices enable ready calculation of the amount of handicap necessary to bring each entrant to substantial parity with the other entrants.

In contests of speed, the distances run and the time in which such distances are run are vital factors for attaining some general rating. The weight or load carried by the entrants and short distances or lengths by which some of the entrants are beaten in fairly matched contests constitute factors which are principally considered in the allotting of handicaps in a race to be run.

By providing a calculator having a rating scale which is divided into units which represent both weights and short distances, i. e., lengths, I have provided a device which is of considerable utility in various sports for use by contest committee members, racing association secretaries and the like and which is also of value to sports commentators as well as those who are interested in evaluating the probable ability of specific racing boats, racing cars, and racing horses.

Figure 1:
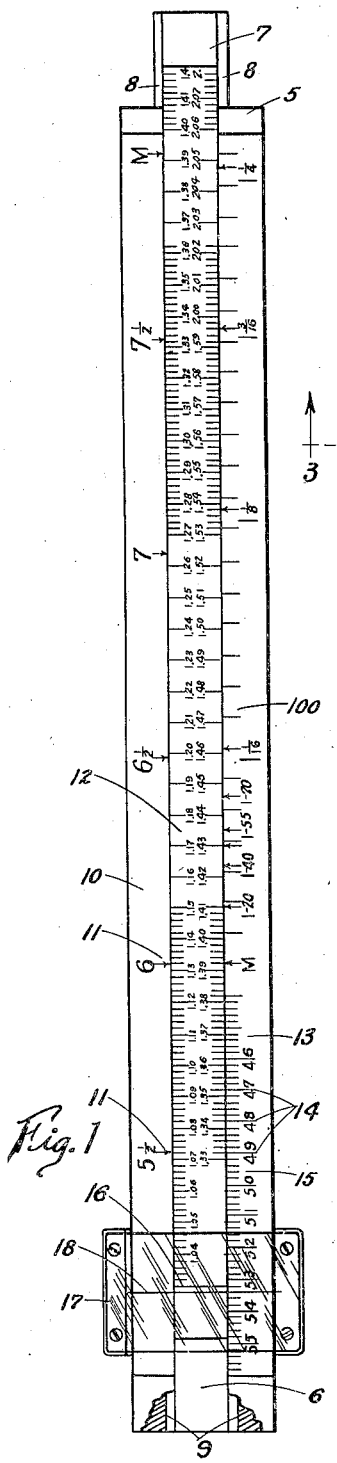
Fig. 1 is a top plan view showing the device of the invention in rectilinear form after the fashion of a slide rule.

The device of the invention is herein exemplified as a calculator for the rating of race horses and particularly for the allotment of weights in proximate races. Referring now to the drawing, and particularly to Fig. 1, the device consists of a body member 5 having a longitudinal groove 6 in which a slide member 7 may be adjusted after the fashion of a slide rule, any suitable means being used to guide these members and retain them in adjusted position, for example, the slide 7 may be provided with lateral ribs or flanges 8 which work in undercut grooves 9 in the side walls of the groove 6. The body 5 carries along its upper face adjacent groove 6 a distance scale 10 which is divided off in certain definite intervals representing distances raced. The indicia or arrows 11 on the scale 10 terminate exactly at the meeting edges of the scale 10 and the time scale 12 which is carried by slide 7. The scale 12 is graduated uniformly into major spaces representing time in seconds and is further subdivided in fifths of seconds. The scale 12 may therefore be said to be graduated in numerals representing time in which races have been run. The intervals between graduations on distance scale 10 represent half-furlongs and the spaces between the successive graduations vary as the time in which the several successive parts of a race course represented thereby have been run in a well executed race, and directly as these amounts of time are measured on the time scale 12. For example, as can be readily seen in the drawing, the space between the 5½ furlong and the 6 furlong mark equals 6 seconds on the time scale while the two succeeding half-furlongs each equal 6⅗ seconds on the time scale 12. In a kindred manner, other fractions represented on the distance scales are varied as the speeds in which the respective fractions of a race course have been run and as the time is measured on the time scale 12. In order to reduce the length of the device the faces on the top of body 5 on both sides of groove 6 are utilized, in the present instance a second scale 100 being used and starting with its lowest distance mark equaling the highest distance mark on the scale 10. The scale 100 begins farther away from the lefthand end of body 5 than does the scale 10, thus providing at the lower lefthand end of the body 5 a space in which a rating scale 13 is provided. The major divisions 14 of rating scale 13 are arbitrarily numbered from 46 to 55, the lesser number in this instance representing the superior rating. It is to be understood that the order of the arbitrary numbers may be reversed on the scale in which the higher number would represent the superior rating. The space between adjacent rating numbers is subdivided into fifths by the graduations 15 and in this subdivision each of the spaces also represent both a length beaten and three pounds of weight carried. The distance scale conveniently begins with the shortest total distance upon which calculations are likely to be based, while the time scale begins with the lowest or shortest time in which the shortest distance is likely to be run and proceeds uniformly as a time scale against which the successive distance fractions are plotted. The rating scale 13 is so placed that the intermediate rating index, viz., 50, will be matched by the end line 16 on slide 7 when the calculator is set according to a high grade performance, i. e., 6 furlongs in one minute, 10 seconds. Regardless of the time and distances used for the calculation, a better speed performance is reflected in a lower rating index number, thus indicating a superior performance, and vice versa. As will be noted in the drawing, the smallest subdivision of the rating scale is uniform with the smallest subdivision of the time scale. The provision of a common factor representing a given weight and the additional amount of distance which a horse should travel without said given weight enables very rapid calculation of weight allotment or other handicap by the operation of the device which will now be described.

In the allotment of weights in a given race to be run, the entrants would be rated by referring to records of past performances of the individual horses. Such information is available to racing secretaries and others in very complete form. Assuming that a given horse previously ran 5½ furlongs in 1 minute and 7⅕ seconds, the slide 7 would be shifted in the groove until the smaller graduation beyond 1.07 matches exactly with the arrow 11 at 5½ on the scale 10. At this time the long line 16 at the end of scale 12 will be found to register with the first subdivision line 15 after 53 on scale 13 which would be read 53⅕. If the horse won the race from which this initial setting was obtained, then the rating 53⅕ would be established for that horse for the recorded race. If however, the horse was beaten by one length, the rating would be increased to 53⅖. A transparent runner 17 such as is commonly used on slide rules is provided with a hairline 18 in known fashion and this runner may be used to assist in correctly reading the setting of the scales and it is also desirably used in making adjustments for lengths beaten without necessitating further movement of the slide 7. The other entrants in the proposed race are rated in a like manner and their ratings are compared and the horse with the lowest rating number would be assumed, in all likelihood, to run first in the proximate race while a horse with the highest rating number would be assumed to run last if all horses carried the same weights as they did in the previously recorded races from which the ratings were taken. The list of ratings of the entrants would then be scanned to determine the difference or number of small spaces between markings 15 on the rating scale between the horses having the highest and the lowest rating numbers on that scale. It is possible, when there is not too great a diversity between the best and the poorest ratings of the entrants, to quickly establish a practicable weight allotment by setting the hairline 18 at a mark halfway between the extreme ratings and then adding 3 lbs. to the previously carried weight for each of the spaces between the hairline and the rating numbers of entrants which are to the right of the hairline 18 and taking away from previously carried weights, 3 lbs. for each space between the hairline 18 and the rating numbers of the entrants that are to the left of said hairline 18. As an example, if the highest number rating were 53⅖ and the lowest 52⅕ the hairline 18 would be set at 52⅘ which is halfway between the said extreme ratings. Each of said extreme rating numbers would be 3 spaces from the hairline and the allotted weight of the fastest horse would be three times three pounds more than was carried in the previously recorded race while the slowest horse would have a like amount of weight taken from his previously carried weight. Other weights would be added or taken from the previously carried weights of entrants having intermediate ratings. It will be understood that it is not always feasible to calculate the weight allotments as simply as in the foregoing example particularly where one or two entrants may appear so far outclassed by the majority of entrants as to enable no practical assignment of the full quota of added weight to the faster horses or to take away the necessary amount of weight from the outclassed entrants. The manipulation of the device, however, enables the racing association secretary to quickly make up one or more sets of trial allotment weight figures in order to arrive at a fair and practicable weight allotment for at least a majority of the entrants, it being understood that the condition of the entrants deducible from a comparison of the ratings of a given entrant at different times may, in the judgment of the secretary, warrant a further adjustment of weight allotment in a given case accordingly as the horse under consideration may be shown to have consistently improved or grown stale.

It is to be understood that the device of the invention is not limited to the specific form shown for promoting fair and interesting horse races since it may be modified and different factor values assigned to the several scales thus adapting it to motor car and power boat racing. It will be appreciated that in the latter event it may, under some circumstances, be proper to distribute the handicap figures in terms of distance instead of weight.

Figure 2:
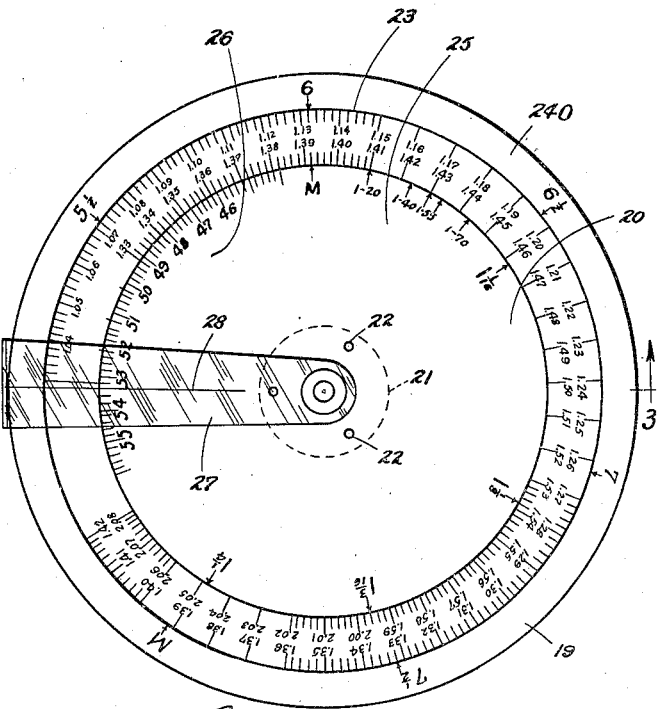
Fig. 2 is a plan view of a modified form of the invention employing relative movable circular disks.
Figure 3:
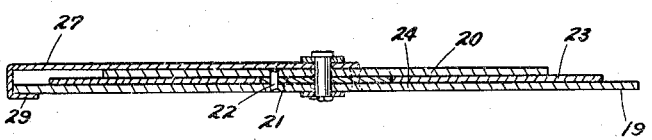
Fig. 3 is a cross-sectional view taken on line 3—3 of Fig. 2.

The modified structure shown in Figs. 2 and 3 is comparable in all operating respects to the device of Fig. 1 as hereinbefore explained. This form of the device comprises disks 19 and 20 which are spaced apart and secured to a small spacer disk 21 by any suitable means such as grommets 22 or by gluing the opposite faces thereof to the disks 19 and 20 respectively.

Intermediate disk 23 has a central aperture 24 which receives disk 21 thus making the unitary structure 19, 20 and 21 movable relative to disk 23. On disk 19 is a scale 240 comparable to scale 10 of Fig. 1. On disk 20 there is a scale 25 corresponding to scale 100 in the device of Fig. 1 and also a rating scale 26 corresponding to rating scale 13 of Fig. 1. A transparent body strip 27 having a hairline 28 is mounted above disk 20 and pivoted for rotation. The end of transparent runner 27 may be turned downwardly and inwardly as at 29 to slidably engage about the reversed face of disk 19. The manipulation of the dial type calculation device will be obvious in view of the foregoing explanation. The intermediate disk 23 corresponds to the slide 7 of Fig. 1 and has corresponding scales thereon. It is to be understood that the invention herein is not to be considered as limited to the specific mechanical structures employed since they may readily be modified without materially altering the operative relationship of the particular scales employed.

What is claimed is:

A calculator comprising a pair of relatively movable members, one of said members having spaced apart scales of unequal length, the longer of said scales being graduated according to distances raced by contestants, the graduations of that said scale being variably spaced and the spacing between any two successive graduations corresponding to the average time required by contestants to negotiate the additional distance represented between said successive graduations, the shorter scale graduated according to arbitrary rating values and being further subdivided into units each of which represents both a predetermined length and a predetermined weight, the other of said relatively movable members provided with a scale uniformly graduated according to time in which the distances raced are run and having subdivisions representing fractional seconds, the fractional seconds subdivisions being uniform with the subdivisions of the rating figures.

LEO G. KUHLMAN.